Nov. 8, 1932.    G. S. SUPPIGER    1,887,073
METHOD OF FLAVORING IN CANNING, PRESERVING, AND BOTTLING OPERATIONS
Filed Jan. 2, 1931
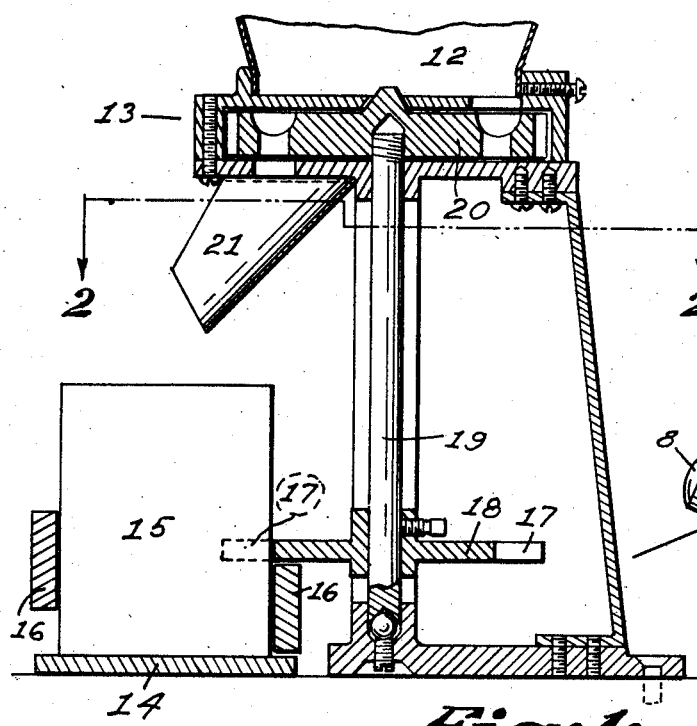
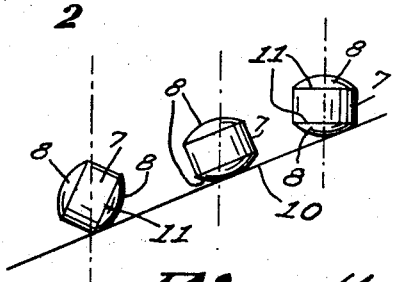
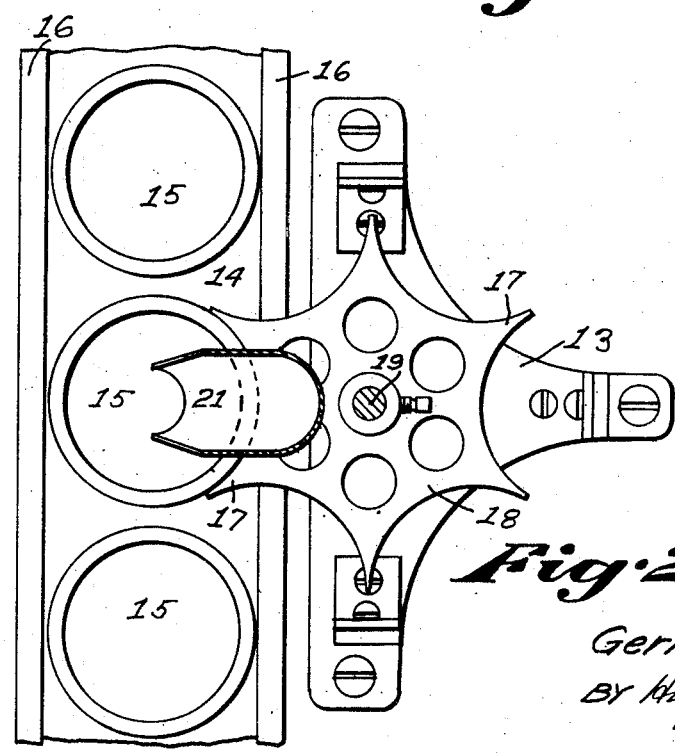
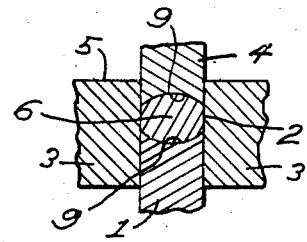
INVENTOR:
Gerhart S. Suppiger,
BY Hugh K. Wagner,
ATTORNEY Patented Nov. 8, 1932

1,887,073

UNITED STATES PATENT OFFICE

GERHART S. SUPPIGER, OF BELLEVILLE, ILLINOIS, ASSIGNOR TO SCIENTIFIC TABLET COMPANY, OF BELLEVILLE, ILLINOIS, A CORPORATION OF ILLINOIS

METHOD OF FLAVORING IN CANNING, PRESERVING, AND BOTTLING OPERATIONS

Application filed January 2, 1931. Serial No. 506,079.

This invention relates to a method of flavoring in canning, preserving and bottling operation; and consists in the novel procedure hereinafter disclosed.

The application is a continuation in part of my prior application Serial No. 145,706, filed November 1, 1926, for flavoring tablets, and a continuation in part of my application Serial No. 205,892, filed July 15, 1927, for apparatuses for and method of dispensing flavoring materials.

Heretofore, the flavoring or seasoning materials, such as sugar, salt, and the like, have been added to the food receptacles or merchantable containers in finely divided, comminuted, or granulated form. This method of dispensing the material is objectionable because some of it is inevitably spilled or deposited outside of the can or container for the food product, especially when the comminuted seasoning or flavoring material is dispensed manually by means of spoons, in which case the charges that the spoons convey will obviously vary in quantity. The desirability of obviating these disadvantages will be better appreciated when it is understood that the charges of flavoring or seasoning material are usually added to the containers while they are rapidly traveling in sequence past the dispensing point or station, thereby aggravating the tendency to spill. Moreover, a charge of finely divided material tends to spread in falling and the stream must necessarily flow a longer time than would the concentrated charge of a single body, thereby increasing the liability of spilling and non-uniformity.

Furthermore, if the flavoring or seasoning material is soluble, it will dissolve much more slowly when it is concentrated into a single body than when it is loose and finely divided, since the concentrated single body presents a much smaller surface to the solvent in proportion to its mass or volume than does the finely divided material. In some canning operations heretofore employed, a solution of the seasoning or flavoring material, if soluble, is first prepared and then added to the food product, principally because a solution, if its use is desirable, can be more easily dispensed than the finely divided material. However, the applicant has discovered that it may be highly advantageous in some cases to add the soluble material to the food product or its container in solid form, and concentrated into a single body so as to delay its solution, as will hereinafter more fully appear.

Accordingly, this invention purposes to consolidate the uniform charges of loose granular or comminute material into single bodies, which are then distributed to the containers, preferably, although not necessarily, by any suitable automatic dispensing machine, of which that disclosed in the aforesaid application, Serial 205,892, is typical.

Other objects, advantages, and desirable features of the invention will appear in the course of the following description of an illustrative embodiment of the spirit thereof.

In the accompanying drawing forming part of this specification, in which like numbers of reference denote like parts wherever they occur, Fig. 1 is a fragmentary vertical central sectional view of a dispensing machine, such as is disclosed in the aforesaid application for United States patent, Serial No. 205,892, showing it associated with a conveyor and the containers thereon, for the purpose of carrying out the process of the present invention;

Fig. 2 is a horizontal sectional view, taken on the line 2—2 in Fig. 1;

Fig. 3 is a side view of a tablet used in practice of this invention;

Fig. 4 is a fragmentary view showing several positions of a tablet on a slightly inclined plane or spout; and Fig. 5 is a fragmentary vertical central sectional view of a die and a tablet which is being compressed therein.

The charges of finely divided seasoning or flavoring material may be concreted into individual coherent masses in any suitable manner and may have any suitable shape. However, if the seasoning material, such as salt, pepper and the like, is capable of being formed into the lumps or masses by compression, the operation is preferably carried out by means of dies of the character shown in Fig. 5. The lower plug 1 in the hole 2 of the die 3 is preferably stationary, but can be adjusted vertically to regulate the depth of the hole, and thereby the quantity of material which can be put thereinto. After the upper plunger 4 has been lifted out of the hole 2, any surplus material above the upper face 5 of the die 3 is removed. When the plunger piston 4 descends, it compresses the comminute or granular material in the cylindrical hole 2 to the proper degree to form a coherent mass of the same in the form of a tablet 6. The preferred form of tablet has a cylindrical face 7 and convex sides 8, the plug 1 and plunger 4 having concave faces 9 to form the convex sides 8. One of the advantages of the disk form of tablet over the spherical form is that the same die may be used to produce tablets of different weights by varying the thickness of the tablet. The advantage of the convex faces 8 of the tablet 6 over the flat sides of the usual form of disk tablet resides in the fact that that tablet 6 can roll on its convex faces 8, as well as on its cylindrical face 7, thereby insuring its passage down a slight incline, as shown in Figure 4; whereas a flat-sided disk must slide on an incline when in its prone position, thereby tending to stick if the incline be too small. When the tablet is deposited on an incline 10, as indicated by the tablet 6 farthest to the right in Fig. 4, its center of gravity will be some distance to the left of the point of engagement of its convex side 8 with the inclined plane 10, thereby causing it to tilt on its convex side 8 until its edge 11 engages the surface 10, as indicated by the tablet at the left of Fig. 4, when it will tumble or rotate on the edge 11 and then roll down the incline on its face 7. Even though the disks 6 could not roll on the faces 8, they would make only a point contact with the plane 10, on which the disks would easily tend to spin and thereby facilitate the descent of the disks or tablets down the incline 10. Best results are secured in preventing jamming in the dispensing machine and in conveying the tablets when the thickness of the disk is substantially equal to their diameter.

The disks or tablets 6 are placed in the hopper 12 of a dispensing machine 13, which may be of any suitable form, but is exemplified by the machine disclosed in applicant's aforesaid prior application for United States Patent Serial 205,892. The machine 13 is stationed alongside a conveyor 14, which is preferably of the endless belt type, and carries cans or receptacles 15 in sequence past the machine 13, preferably between guides 16, that prevent lateral displacement of the receptacles or containers 15. Assuming that the containers 15 are moving away from the observer, Figure 1, they will engage the projections 17 of a star wheel 18 that obstruct their path, so that each receptacle rotates the star wheel 18 clockwise through sixty degrees, since there are six projections 17 thereon. The rotation of the star wheel 18 is communicated through a shaft 19 to a discharger disk 20, which discharges one tablet 6 into the spout 21 each time the star wheel rotates through sixty degrees. The angular position of the star wheel 18 with relation to the discharger disk 20 is such that a container 15 is directly under the spout 21 each time a tablet 6 emerges therefrom to enter the container 15. The containers 15 may be filled with the food product either before or after they pass the tablet dispensing station or the machine 13, but preferably they are filled before receiving the tablets 6. It will be appreciated that the tablets may be dispensed by hand as well as mechanically; but, in either case, the whole charge for each can is dispensed simultaneously, without the possibility of a portion thereof preceding or lagging behind another portion, thereby insuring a precision in dispensing the flavoring material not obtainable when the material is dispensed in granulated form. The tablets 6 are uniform in volume, weight, and shape for a predetermined quantity of food product in each container. When the containers 15 have passed the dispensing station for the tablets, they are closed and sealed in any suitable or common manner.

The advantages of the method of the present invention will be more highly appreciated when this method is contrasted with methods hitherto prevailing. This is particularly true when salt is the flavoring material, and is used, for instance, to flavor tomatoes.

In that type of canning operation in which the salt is added after the can has been filled, the fact that the tablet does not go into solution until the can is sealed and is being processed, is a most important factor. First, because the tablet goes into solution slowly, and there is at no time a strong brine solution in any part of the can, so that the seed cells are kept intact and are not broken down, and second, no salt is wasted. If, when the plunging device of the closing machine operates, some surplus liquid is expelled, it will contain no salt as the tablet has not as yet dissolved, even partially.

Contrast this with the method of using raw salt or brine. In the first place, raw salt goes into solution immediately, and a strong concentrated brine forms at the top of the can, with several deteriorating results. This strong brine breaks down the seed cells and the color as well, thereby materially decreasing the value of the product. Then too, the fact that the raw salt has gone immediately into solution and has remained at the top of the can will cause a great deal of the salt to be eliminated when the plunger of the closing machine operates. This produces unevenness of salting. This results not only in a loss of salt, but also in deterioration of machinery through the corrosive action of salt on all surrounding canning equipment, and the containers themselves. Just a slight amount of brine spilled on the outside of the cans, will, in the course of a day's operation, so contaminate the retort water that all cans put into this water will be affected, and will become rusty and corrode.

In canning operation in which the salt is deposited into the empty can before the vegetable to be canned is added, the fact that the tablet does not go into solution immediately is an outstanding advantage. The cans, having recently been washed, reach the canning line in a moist condition. Raw salt, promptly dissolves, and the resulting heavy brine solution affects the tin, leaving a dark deposit in the bottom of the can.

Where brine is used in the canning process, the method of depositing a tablet into the can, either filled or empty, and adding hot water to overflow, is infinitely better than the addition of a prepared brine solution, primarily because it affords a uniform degree of saltiness to the pack, whether the pack is of a loose or compact nature. It can readily be seen that more brine will be added to a loosely packed can, if that method is used, than one that is more compact. Then too, brine must be hot when added to the cans, and, as it is made to a certain gravity in tanks considerably removed from the immediate canning line, in the various stages of evaporation it provides a varying degree of saltiness to the product. Adding brine to overflow is wasteful, and extremely harmful to cans and machinery. In some canneries, an attempt is made to recover this overflow brine, but this necessitates a costly installation of special pumps, and, at best, is of doubtful sanitation.

Certain vitamines found in canned foods, when heated in air, are destroyed. For this reason, especially in the production of tomato juice, instead of flavoring and heating in open tanks and then packaging, the present invention contemplates putting the cold juice in cans, adding the salt tablet, exhausting to eliminate air, sealing and then processing. Consequently all valuable vitamines are retained.

The salt tablet method simplifies the entire salting operation, eliminates costly tanks, pumps and pipes, and avoids corrosion of expensive machinery, but of vastly greater importance is the assurance that the accurately weighed tablet that has been added to the product, will mean an absolutely uniform degree of saltiness in each and every can.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. In the process of packing food products in containers in which the containers are filled in sequence with the food product partially in solid and partially in liquid state, and in which the contents of the container are subjected to agitation in the canning process subsequent to being filled, that improvement which consists in adding to the container a flavoring in the form of a compacted body having a low solution factor in the liquid in the container, and thereafter sealing the container before any substantial dissolution of the flavoring body.

2. In the process of packing food products in containers in which the containers receive the food product, including a quantity of liquid and in which the contents of the container are subjected to agitation before the containers are capped, that improvement which consists in salting the contents of the container by adding thereto a salt tablet in a highly compacted form of uniform volume, and thereafter sealing the container before any substantial dissolution of the salt tablet occurs.

3. In the process of packing food products in containers in which the food product, partially in solid and partially in liquid form, is delivered to the container to substantially fill the same, that improvement which consists in adding a flavoring to the food product in the form of a closely compacted body of a predetermined weight, and then sealing the container before any substantial dissolution of the flavoring body occurs.

In testimony whereof I hereunto affix my signature.

GERHART S. SUPPIGER.